Figure 1:
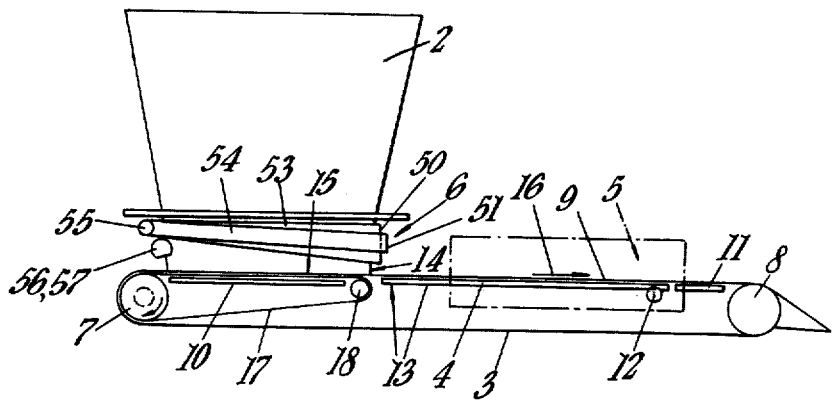

Nov. 12, 1963    J. H. C. ATKINS ETAL    3,110,419
CONTINUOUS WEIGH FEEDER
Filed Nov. 29, 1960    4 Sheets-Sheet 1

INVENTORS
JOHN HARRY CLAPHAM ATKINS
ROBERT WILLIAM FULLER

BY
*Herman, Herman & McCulloch*
ATTORNEYS

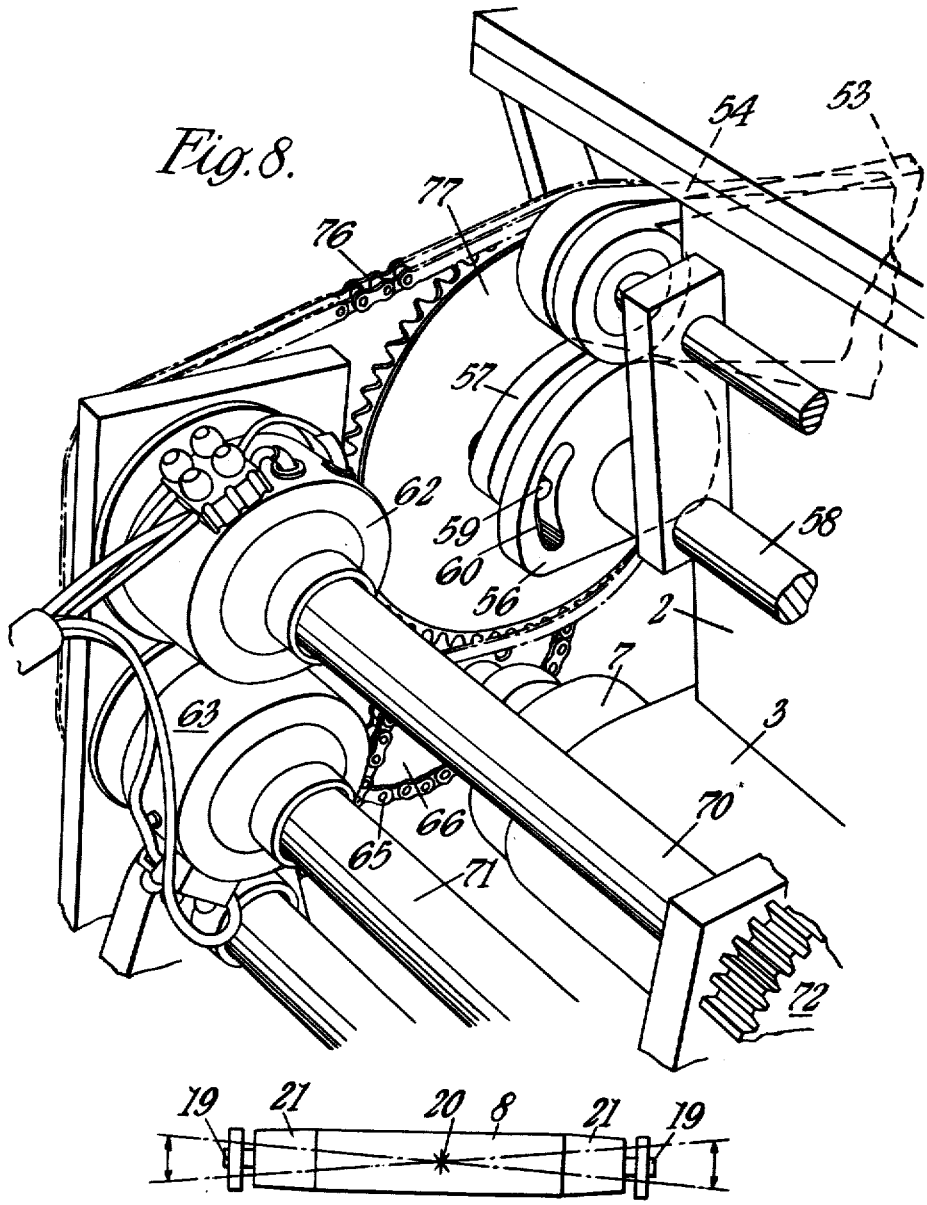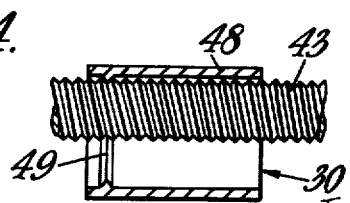

INVENTORS
JOHN HARRY CLAPHAM ATKINS
ROBERT WILLIAM FULLER

BY
*Farman, Farman, & McCulloch*
ATTORNEYS

United States Patent Office 3,110,419
Patented Nov. 12, 1963

3,110,419
CONTINUOUS WEIGH FEEDER
John Harry Clapham Atkins and Robert William Fuller, Peterborough, England, assignors to Baker Perkins Incorporated, Saginaw, Mich.
Filed Nov. 29, 1960, Ser. No. 72,413
Claims priority, application Great Britain Nov. 30, 1959
7 Claims. (Cl. 222—55)

This invention relates to continuous weigh feeders of the type comprising a hopper or like storage means (hereinafter referred to as a hopper) having controllable discharge means at or near its bottom, moving conveyor belt means disposed beneath the discharge of the hopper and presettable weighing means associated with the conveyor belt which continuously weigh the material in transit on the conveyor belt from the hopper and operates, on variation of the weight of material from a preset weight datum, to actuate means controlling the discharge means of the hopper so that the rate of feed therefrom to the conveyor belt is appropriately altered. The principal purpose of such continuous weigh feeders is to provide a continuous gravimetrically controlled supply of material from a bulk source.

It is an object of the present invention to provide an improved construction of continuous weigh feeder which provides accurate gravimetric control of the material delivered by the conveyor belt and which reacts quickly to changes in the gravimetric loading on the conveyor belt.

It is a further object of the present invention to provide a continuous weigh feeder which, while of simple and robust construction, is capable of exercising adequately accurate gravimetric control even for small outputs.

A still further object of the present invention is to provide a continuous weigh feeder in which the weight sensitive parts of the machine are shrouded from dust which would otherwise seriously affect the performance of the machine and in which the effect of the deposition of dust on other parts of the weighing system is reduced to a minimum.

Among still further objects of the present invention are, in continuous weigh feeders of the type indicated, provision for belt tensioning and the prevention of belt slip, means for providing for the accurate tracking of the belt and the provision of an improved and simplified rider weight for the mechanism.

According to one feature of the present invention, a continuous weigh feeder of the type indicated is provided in which the conveyor belt structure is fixed with relation to the hopper, but includes a section whereat the flexible conveyor belt is supported from underneath by a weighing platform arranged cantilever-wise from a pivot such that its free, swinging, end is immediately or closely adjacent to the delivery of the hopper and its pivotal axis is remote therefrom. By this arrangement more accurate feed rates are obtained since any changes in weight are detected as early as possible after the material has left the hopper, so enabling any desired correction to be brought about as quickly as possible.

According to a further feature of the present invention, a continuous weigh feeder is provided with a cantilevered weighing platform supported on a pivot shaft, preferably located remote from the hopper delivery point, and a weighing mechanism located to one side of the weighing platform and operatively connected to the weighing platform shaft, the weighing mechanism being entirely enclosed in a dust-proof housing into which the weighing platform shaft passes through a thin, flexible, dust-proofing diaphragm or other gland means. By this arrangement no dust can be deposited on the weighing mechanism and the diaphragm gland means surrounding the weighing platform shaft exerts no effective influence on the free movement of the weighing system since the amount of radial movement of the shaft is very small.

According to a still further feature of the present invention, in a continuous weigh feeder of the type indicated, the conveyor band passes at its delivery end round a free running roller, the opposite end portions of which are slightly tapered so that the roll diameter is progressively reduced at each end of the roller and the roller is mounted so that its axis can experience transverse pivotal movement, the arrangement being such that after an initial tracking correction is effected by means of adjusting and fixing the pivotal angle of the roller axis, the tapered ends of the rollers maintain the conveyor belt in correct track.

While the features of the continuous weigh feeder, according to the present invention, may be incorporated in a weigh feeder having a hopper equipped with any convenient form of controllable output discharge means, it is a further feature of the invention to provide an improved discharge control means for the hopper. This improved discharge control means comprises, in association with a bottomless hopper closed off by a portion of the conveyor band itself, adjustable gate means provided on the side of the hopper bottom facing the direction of movement of the conveyor band, said adjustable gate means comprising a first raisable and lowerable gate having an upwardly extending slot formed through the central portion thereof and a second raisable and lowerable gate means overlying said first gate means and adapted to be moved relative to the first gate means to cover or uncover less or more of the central slot, the raising and lowering of the adjustable gates being controlled by the weighing reactions of the weighing mechanism such that the two gates move together for major weight correction while the second gate moves relatively to the first gate for effecting minor weight corrections by varying the available sectional area of the central slot in the first gate means.

According to a preferred mode of operating the adjustable gate means, the second gate means, the second gate means is raised or lowered by a cam driven from a reversable drive and the first gate means is raised or lowered by a cam driven from the rotation of the second gate cam means only when the second gate means has wholly covered or wholly uncovered the central slot in the first gate means. Thus the second gate means may be cam displaced until the central slot in the first gate means is wholly covered (i.e., the second gate moves and the first gate is stationary), further correction movement of the second gate means causes it to carry the first gate means down with it until the correction has been made. Conversely when the second gate is raised until the slot in the first gate is fully uncovered, further raising of the second gate carries the first gate with it until the correction is made.

In order to avoid belt slip and avoid undue tensioning of the belt (which affects the sensitivity of the weighing operation), when a bottomless hopper is used closed by the belt so that the whole weight of the hopper contents presses on the belt and tends to grip it against a backing plate, the drive to the conveyor belt is from a rear roller, i.e., a roller behind the hopper, so that the top run of the conveyor belt is pushed, an auxiliary belt being provided between the driving roller and the backing plate and the conveyor belt. The auxiliary belt terminates short of the weighing platform and so can be tensioned as much as required, while providing a large area frictional drive to the underside of the conveyor belt; thus the conveyor belt is not pressed by the material in the hopper against a fixed surface and is not subjected to drag or gripping.

Figure 2:
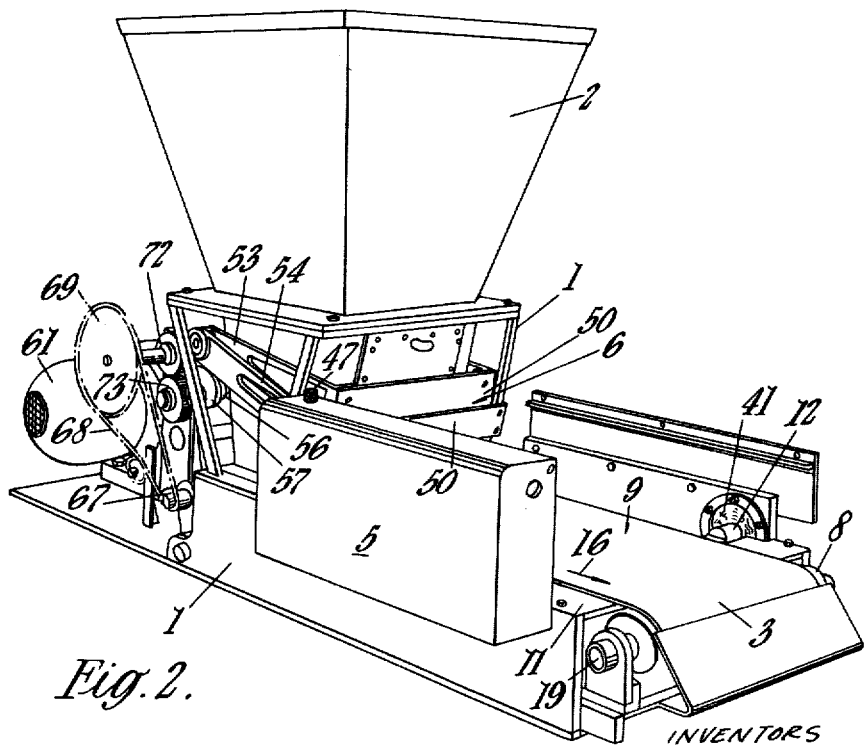
Figure 3:
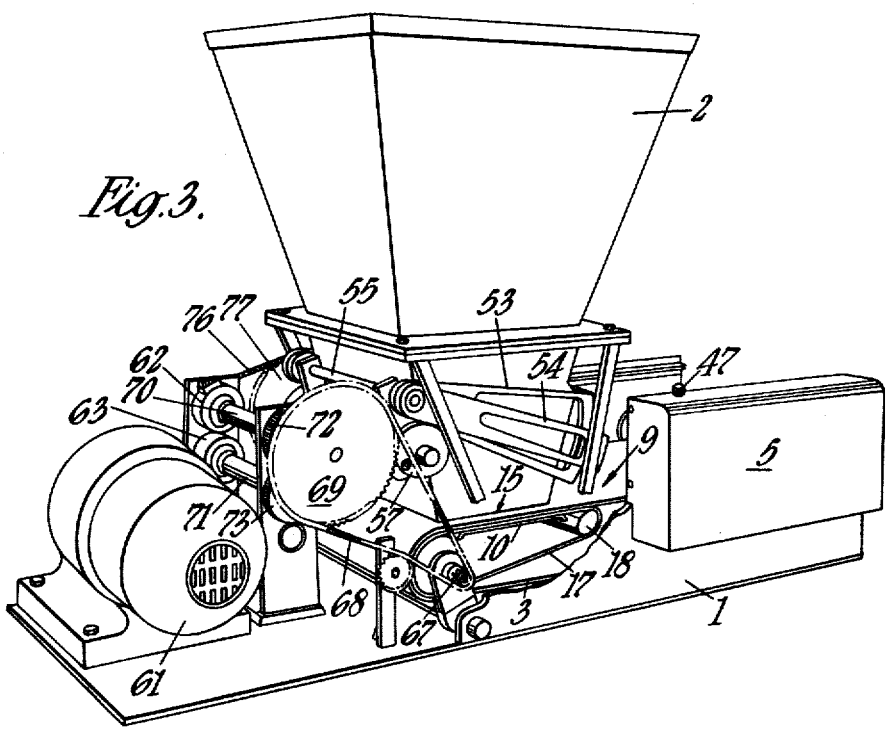
Figure 5:
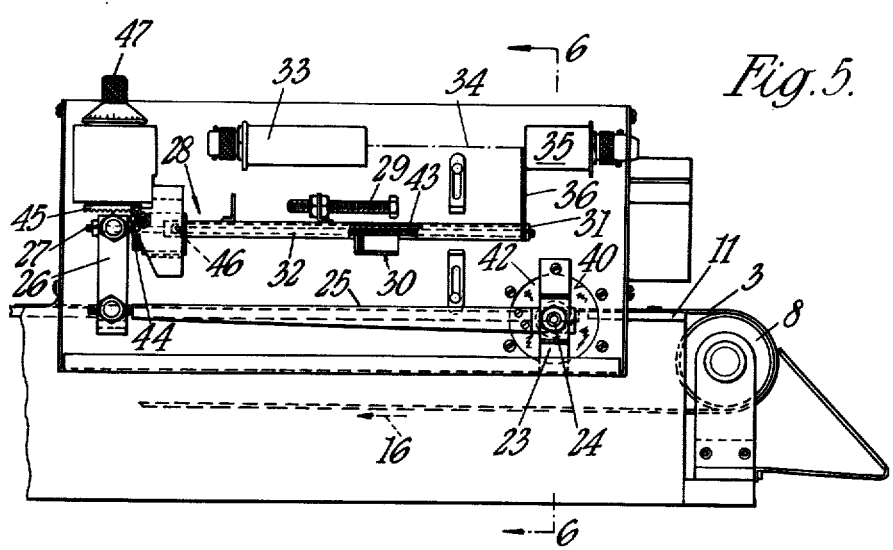

In the accompanying drawings:

FIGURE 1 is simplified diagrammatic side elevation of a weigh feeder according to the present invention, FIGURE 2 is a front perspective view of one embodiment of a weigh feeder according to the present invention, FIGURE 3 is a rear perspective view of the weigh feeder shown in FIGURE 2, FIGURE 4 is a detail plan of the discharge end roller for the conveyor of the weigh feeder, FIGURE 5 is a side elevation of part of the weigh feeder shown in FIGURES 2 and 3 showing the weighing mechanism.

Figure 9:
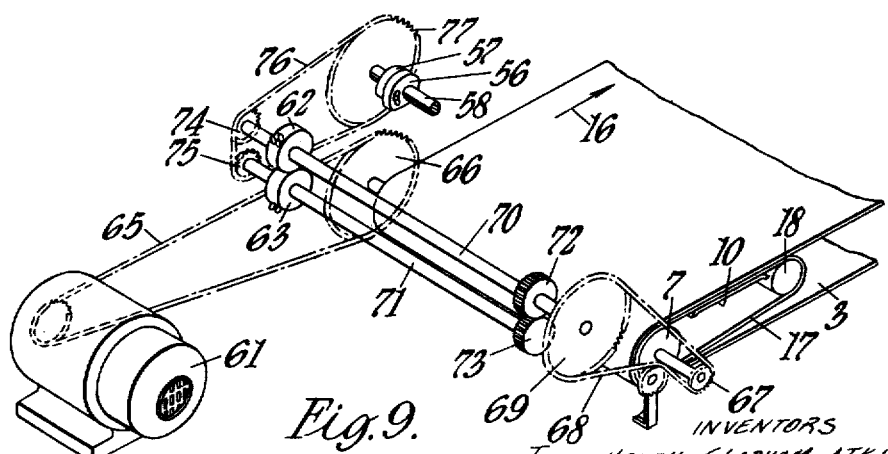
Figure 6:
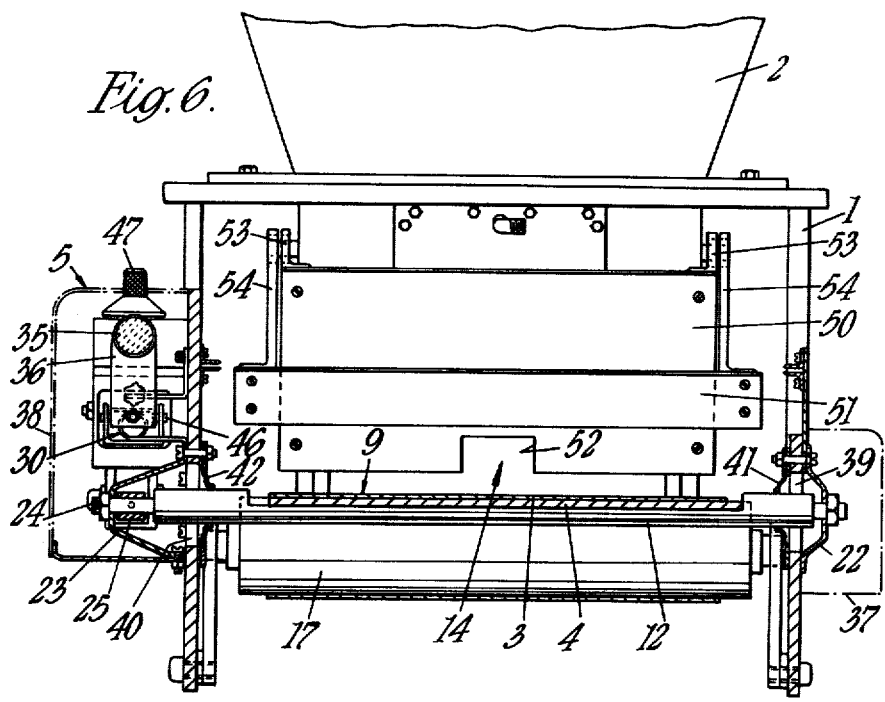

FIGURE 6 is a sectional end elevation of the weigh feeder shown in FIGURES 2 and 3 taken on the line 6—6 of FIGURE 5, FIGURE 7 is a sectional detail of the rider weight for the weighing mechanism shown in FIGURE 5, FIGURE 8 is a fragmentary perspective view of part of the hopper control mechanism shown in FIGURE 3, and FIGURE 9 is a diagrammatic perspective view of the conveyor and hopper control drive means for the weigh feeder shown in FIGURES 2, 3 and 8.

In carrying the invention into effect according to one mode by way of example, the continuous weigh feeder comprises, in essentials, a framework 1 supporting a hopper 2 and an endless belt conveyor 3 running beneath the hopper 2, a weighing platform 4 associated with the conveyor belt 3, a presettable weighing mechanism 5 associated with the weighing platform 4, adjustable means indicated generally at 6 for varying the rate of delivery of material from the hopper 2 to the conveyor belt 3 and means, described hereinafter, for adjusting the variable delivery means 6 according to signals received from the weighing mechanism 5.

Towards the rear of the framework 1, a conveyor belt turning point roller 7 is mounted and at or towards the other end of the framework a discharge turning point roller 8 is mounted so that the conveyor belt 3 has a horizontal upper run or lap 9 between the two rollers 7 and 8. The conveyor belt 3 is supported, over its zone located beneath the hopper 2, by an underlying fixed backing plate 10 and a similar backing plate 11 may be provided at or adjacent the discharge end of the conveyor run, so that between the two backing plates 10 and 11 a gap is provided spanned by the upper lap 9 of the conveyor belt. In this gap and beneath the belt lap 9, the weighing platform 4 is provided supported on a transverse shaft 12 located at the end of the gap remote from the hopper 2 so that the weighing platform 4 extends cantilever-wise from the shaft 12 in the direction of the hopper 2. Preferably the free end 13 of the weighing platform 4 should be located as near as possible to the delivery outlet 14 of the hopper 2 so that weight deviations can be detected, and corrected, as soon as possible.

The hopper 2 is supported over the conveyor band 3 above the fixed plate 10 and has an open bottom 15 which is closed off by the conveyor band 3 itself. The base of the hopper 2 facing the direction of movement (see arrow 16) of the conveyor band 3 is open to provide the delivery outlet 14 and allow the movement of the conveyor band 3 to carry material from the hopper 2 along with the band, but in order to control the delivery of material to the band 3, the variable delivery means 6 (comprising adjustable gate means described hereinafter) are associated with the delivery outlet 14 of the hopper 2 so that the rate of feed from the hopper 2 is governed by the height of the gate means above the conveyor band 3.

Since it is essential that the conveyor band 3 is accurately driven at constant speed, it is necessary to prevent any slip in the belt drive; however, it is equally necessary to avoid over-tensioning the belt 3 since this will affect the accuracy of the weighing operation of the belt as it passes over the weighing platform 4. Furthermore, where, as described above, the weight of the material in the hopper 2 presses the conveyor belt 3 against its fixed backing plate 10, it is necessary to compensate for the drag of the material and to overcome the consequent drag due to the fixed backing plate. To this end an auxiliary drive belt 17 is interposed between the rear roller 7 and fixed backing plate 10 and the underside of the conveyor belt 3. The auxiliary belt 17 terminates at the beginning of the gap in which the weighing platform 4 is located and is there passed around an idle roller 18 back to the rear roller 7 which is driven as described hereinafter. Thus the drive to the conveyor belt 3, is in effect, arranged to operate as from the rear roller 7 through the auxiliary belt 17 whereby the upper lap 9 of the conveyor belt 3 is the "slack" side and the belt is pushed in the direction of, and over, the weighing platform 4. The auxiliary belt 17 can be driven with any desired amount of tension to ensure a positive drive thereto, and the conveyor belt 3 is effectively driven by the surface of the auxiliary belt 17, which is conveniently a rubber belt, over an extended length of contact area so that a positive and constant speed drive to the conveyor belt 3 is obtained. Further, over the area where the effect of the loading of the contents of the hopper 2 are experienced, the conveyor belt 3 is not held against the fixed surface of the backing plate 10 but against the already moving surface of the driven auxiliary belt 17.

In order to ensure proper tracking of the conveyor belt 3, the discharge roller 8 of the conveyor belt is mounted on a shaft 19 such that the shaft 19 can be pivoted through a small angular adjustment on a central pivot point 20 and locked in any desired position. The roller 8 itself is formed with a slight taper 21 at each end so that its diameter decreases at each end away from the centre of the roller. In order to achieve proper tracking, the discharge roller 8 is adjusted to its correct alignment by suitable pivotal adjustment and is locked in position and thereafter the end tapers 21 of the roller maintain the band 3 in proper track.

As mentioned above, the conveyor belt 3 passes over a weighing platform 4, which is conveniently in the form of a single flat sheet of metal located in the gap between the two fixed backing plates 10 and 11 beneath the conveyor belt. The platform 4 is mounted cantilever-wise on the previously mentioned shaft 12 running transversely across the machine and forming the fulcrum for the weighing platform 4, and the ends of the transverse shaft 12 are extended laterally and are received in bearings 22 and 23 on each side of the conveyor belt path. Clamped adjacent the end 24 of one of the shaft extensions is a lever arm 25 which, mechanically, serves as a "dummy platform" and imitates and follows the movements of the platform 4 for operation of the weighing mechanism 5. At the extreme outward end of the lever arm 25, a yoke 26 connects with the short lever arm 27 of a steel-yard mechanism indicated at 28, equipped with an arrangement of variable weights 29, 30 described hereinafter which can be preset according to the desired gravimetric rate of feed for the weigh feeder. The swinging end 31 of the long arm 32 of the steelyard is provided with means for actuating over-weight and under-weight detecting means, which may be conveniently in the form of photo-electric cell means. Thus, a light source 33 is arranged to project a beam of light 34 in the direction of a photo-electric cell 35 and the end 31 of the steel-yard arm 32 carries a masking plate 36 arranged so that when the arm is in balance the plate 36 masks, say, half the sensitive area of the cell 35, but on the arm moving to record an over- or under-weight, the masked area of the cell 35 is decreased or increased respectively to cause the cell to become less or more light activated and thereby to carry out a material control function on the hopper variable delivery means as described hereafter.

The shaft bearing 23 and weighing mechanism 5 described above (and the bearing 22 at the other end of the shaft 12) are enclosed in dust-proof housings 37 and 38, the ends of the shaft 12 passing through holes 39 and 40 in the housings closed by light rubber diaphragms 41 and 42 secured around the holes and to the adjacent portions of the shaft. Since the angular rotation of the shaft 12 is very small, the diaphragms 41 and 42 do not interfere with the accuracy of the weighing operations.

The weight adjustment system of the steel-yard mechanism 28 comprises a movable and/or variable main weight 29 and a rider weight 30 for fine adjustment and it is desirable that at least the rider weight 30 can be manipulated from outside the dust-proof housing 38 of the weighing mechanism 5. To this end the rider weight 30 is carried on and moved by a lead screw 43 attached to or comprising the long lever arm 32 of the steel-yard, and the lead screw 43 is manually rotatable through a suitable gear train, including bevel or like gears 44, 45 at the lever arm fulcrum 46, by turning a knob or dial 47 external to the housing. In order to achieve fine adjustment of the weighing mechanism, particularly a low output rate of the weigh feeder, the rider weight 30 must be relatively light and small while being capable of being accurately positioned by rotation of the lead screw 43. To this end, according to the present invention, the rider weight 30 consists of a short metal tube 48 through which the lead screw 43 passes, the tube 48 having an internal diameter which is larger than (for example, about twice) the diameter of the lead screw 43, so that the centre of gravity of the rider weight 30 always lies below the axis of the lead screw 43. The internal surface of the rider weight tube 48 is provided, preferably at or near one end, with an annular rib 49 of a cross-section corresponding to the thread formation of the lead screw 43 so that when the rider weight 30 is placed over the lead screw 43, the annular rib 49 engages at all times in the thread of the lead screw. Thus, for each rotation of the lead screw 43 the rider weight 30 moves one lead screw thread pitch. A second annular rib (not shown) can be provided at or near the other end of tube 48. The clearance between the channel-shaped arm 32 of the steelyard and the lead screw 43 is such as to prevent any vertical and transverse movement of the rider weight 30 which might cause repositioning of the weight, due to the annular rib 49 jumping a thread.

While features of the weigh feeder, according to the present invention, may be utilized with a feed hopper, such as the hopper 2, having any suitable form of variable delivery means which can be controlled by signals from the weighing mechanism 5, it is preferred to provide the variable delivery means 6 in the form of a raisable and lowerable gate mechanism, as mentioned above, to control the quantity of material carried away from the hopper 2 by the moving conveyor belt 3.

The gate mechanism, indicated at 6, consists of two gates, a first gate 50 disposed over the open side 14 of the hopper bottom (which faces the direction of conveyor belt movement) and a second gate 51 which is disposed against the first gate 50 on the side thereof remote from the hopper 2. The first gate 50 has a square, rectangular or other shaped slot 52 cut through it, preferably on the centre line of the conveyor belt, and the width of the slot 52, measured transversely of the conveyor belt 3, may be selected according to the particular application of the weigh feeder, but a convenient dimension of the slot width is, for example, one fifth of the width of the hopper opening 14. The second gate 51, which overlies the first gate 50, is mounted to move relatively to the first gate over the vertical extent of the slot 52 so that the effective area of the slot 52 can be varied.

The two gates 50 and 51 are each swingably mounted on pairs of arms 53 and 54 from a common pivotal axis 55 located behind the hopper 2 and between the pivotal axis 55 and the gates 50 and 51 themselves rotary cams 56 and 57 are provided to raise and lower the gates 50 or 51 by engagement with the arms 53 or 54 of each gate. The cams 57 operating the second gate 51 are positively driven from rotating shaft means 58, described hereafter, while the cams 56 operating the first gate 50 are couplable to the second gate cams 57 so as to rotate only when the second gate 51 has been moved to the top or bottom of the slot 52 in the first gate 50. To this end, considering the cams 56, 57 on one side of the machine only, one of the cams, for example, the second gate cam 57, carries a pin 59 extending parallel to the axis of the cam shaft 58, which passes through an arcuate slot 60 cut in the first gate cam 56, which latter cam is free to rotate on the cam shaft 58. The arcuate extent of the slot 60 in the first gate cam 56 is such that, during rotation of the second gate cam 57 to raise or lower the second gate 51 over the vertical extent of the slot 52 in the first gate 50, no rotation of the first gate cam 56 takes place, but when the second gate 51 reaches the top or bottom of the slot 52 in the first gate 50, the pin 59 in the second gate cam 57 engages one end or the other of the slot 60 in the first gate cam 56 so that further rotation of the second gate cam 57 rotates the first gate cam 56 in one sense or the other so that the first and second gate 50 and 51 are raised or lowered together. It will be obvious that the slot 60 and pin 59 arrangement can be provided in cams 57 and 56 respectively and still provide the same result.

The cam shaft 58 is driven from an electric motor 61, as described hereafter, through two clutch means 62 and 63 adapted, on selective engagement, to rotate the cam shaft 58 in one direction or the other according to whether raising or lowering of the gate 51 or gates 50 and 51 is called for. Thus, for example, two electro-magnetic clutches 62 and 63 (forward and reverse) are provided, the engagement of the clutches being controlled by signals originating from the photo electric cell 35 from the weighing mechanism 5.

On a signal being sent by the weighing mechanism 5 to one or other of the clutches 62 or 63, the cam shaft 58 is rotated to cause the second gate cams 57 to raise or lower the second gate 51 until its lower edge is coincident with the upper or lower edge of the slot 52 in the first gate 50. If by this operation a stable weight condition has not been reached, i.e., if the predetermined gravimetric output is not being achieved, the second gate cams 57 commence to rotate the first gate cams 56 (through the pin 59 and slot 60 drive) thereby causing the first gate 50 to begin to move in the same direction, and at the same speed, as the second gate 51 to bring about a rate of correction of material feed, which, in the specific case mentioned above, is five times that when only the second gate 51 is moving. On reaching a point where the predetermined weight condition has been slightly exceeded, the weighing mechanism 5 reacts to disengage the clutch 62 or 63 in drive and to engage the other clutch 62 or 63. The cam shaft 58 then immediately begins to rotate in the reverse direction and the second gate 51 alone starts moving (lowering or raising) in the opposite direction, the inner gate 50 remaining stationary since the pin 59 on each second gate cam 57 will be moving freely along the slot 60 in the first gate cam 56 and since the angle of friction of the cams 56, 57 is designed so that the first gate cams 56 will not freely rotate under the weight of the first gate 50 and its arms 53.

Since the amount of "overshoot" of the weight feeder is designed to be very small, the pre-set gravimetric output can be thereafter maintained by operation of the second gate 51 only, the first gate 50 only being brought into operation in the event of a change in setting or in the bulk density of the material.

It will be seen that the use of the two gates 50, 51, according to the present invention, affords two rates of correction, the ratio of which is the ratio of the width of the slot 52 in the first gate 50 to the full width of the hopper opening (i.e., 1 to 5 in the example given above).

In addition it will be seen that very small outputs are possible since, below a certain limit, the first gate 50 does not come into operation at all, i.e., is in contact with the surface of the conveyor belt 3, and the total output is that passing through the slot 52 in the first gate 50. Thus, considerably smaller outputs can be achieved before the minimum distance over which the material will bridge has been reached.

A convenient drive arrangement for the conveyor band 3 and the gate-operating cams 56, 57 comprises a chain drive 65 from the electric motor 61 to a sprocket wheel 66 driving the conveyor roller 7 at one end. At the other end of the roller 7 a small diameter sprocket wheel 67 carries a chain drive 68 to a large diameter sprocket wheel 69 which in turn drives two clutch shafts 70 and 71 at the same speed but in opposite directions by virtue of spur gears 72 and 73; the above-mentioned electro-magnetic clutches 62 and 63 are coupled at their inputs to the clutch shafts 70 and 71 and the output of the clutches 62 and 63 carry sprocket wheels 74 and 75, around which is trained a common chain 76 which also passes round a large diameter sprocket wheel 77 mounted on the above-mentioned cam shaft 58. The foregoing chain drive can of course, be replaced by a gear train drive.

Thus, the motor 61 continuously drives the conveyor band 3 and the clutch shafts 70 and 71 (the latter in opposite senses). When either clutch 62 or 63 is actuated, either sprocket wheel 74 or 75 is driven, so that the chain 76 and large diameter sprocket wheel 77 drives the cam shaft 58 in one direction or the other according to which clutch 62 or 63 has been actuated, the rotation of the cam shaft 58 ceasing as soon as the engaged clutch is rendered inoperative again by the control of the weighing device 5.

In order to prevent the control of the weighing device "hunting" between normal running of the apparatus and "overweight" or "underweight" feed conditions, electric relays are incorporated in the circuits between the photo-electric cell 35 and the electromagnetic clutches 62 and 63, which relays only permit either one of the clutches to be actuated when the steelyard arm 32 and the marking plate 36 has dwelt in either an "overweight" or an "underweight" position for a significant period of time, say five seconds.

The variable discharge means for the hopper, comprising the first and second gates and the means for effecting the displacement thereof may be used in circumstances where such hopper control discharge onto a moving conveyor belt is required other than in a weigh feed such as has been particularly described herein.

We claim:
1. Weight feeding apparatus having hopper mean provided with a discharge opening through which material may be discharged, said apparatus comprising means for receiving material discharged from said hopper means; means mounting said receiving means for gravitational movements according to the quantity of material discharged from said hopper means; first gate means adjacent the opening in said hopper more and movable to increase and decrease the size of said opening, said first gate means having a discharge opening therein; second gate means overlying said first gate means and movable relatively thereto to increase and decrease the size of its discharge opening; operating means operatively connected to said second gate means for effecting movements thereof independently of said first gate means; actuating means interconnecting said operating means and said receiving means and operable in response to gravitational movements of the latter to move said second gate means; and lost motion means coupling said second gate means and said first gate means operable to effect movement of the latter in response to a predetermined amount of movement of said second gate means.

2. Apparatus as set forth in claim 1 wherein means is provided for reversing said operating means for moving said second gate means in either of two opposite directions.

3. Apparatus as set forth in claim 1 wherein said lost motion means includes mechanism for precluding movement of said first gate means until said second gate means has been moved to a position adjacent the end of the opening in said first gate means.

4. Apparatus as set forth in claim 1 wherein said receiving means comprises an endless conveyor having upper and lower runs, said upper run passing beneath said hopper means, said upper run having a portion adjacent said discharge opening that is unsupported so as to be capable of deflecting under the weight of material discharged from said hopper means.

5. Apparatus as set forth in claim 4 including means driving said conveyor and so located relatively to said upper run that said upper run is slack.

6. Apparatus as set forth in claim 5 wherein said driving means comprises an endless belt interposed between said upper and lower runs and in driving engagement with said upper run.

7. Weigh feeding apparatus having hopper means provided with a discharge opening through which material may be discharged, said apparatus comprising conveyor means for receiving and conveying away material discharged from said hopper means; means mounting said conveyor means for gravitational movements according to the quantity of material discharged thereto from said hopper means; first gate means adjacent the opening in said hopper means and having a discharge opening therein; means mounting said first gate means for movements in either of two opposite directions for selectively increasing and decreasing the size of the opening in said hopper means; second gate means adjacent said first gate means and overlying the opening therein; means mounting said second gate means for movements independent of said first gate means in either of two opposite directions for selectively increasing and decreasing the size of the opening in said first gate means; operating means interconnecting said second gate means and said receiving means and operable to effect movement of said second gate means in either of said directions in response to gravitational movements of said receiving means; and lost motion means interconnecting said first and second gate means operable in response to movement of the latter a predetermined amount in either of said directions to effect conjoint movement of said first gate means in a corresponding direction.

References Cited in the file of this patent

UNITED STATES PATENTS

| 1,497,619 | Waechter et al. | June 10, 1924 |
| 1,577,636 | Hays | Mar. 23, 1926 |
| 2,273,330 | Robinson | Feb. 17, 1942 |
| 2,889,030 | Mottet | June 2, 1959 |
| 2,966,065 | Renner | Dec. 27, 1960 |

FOREIGN PATENTS

| 712,893 | Great Britain | Aug. 4, 1954 |
| 1,185,180 | France | July 30, 1959 |

UNITED STATES PATENT OFFICE
CERTIFICATE OF CORRECTION

Patent No. 3,110,419                                   November 12, 1963

John Harry Clapham Atkins et al.

It is hereby certified that error appears in the above numbered patent requiring correction and that the said Letters Patent should read as corrected below.

Column 7, line 52, for "Weight" read -- Weigh --; same line 52, for "mean" read -- means --; same column 7, line 59, for "more" read -- means --.

Signed and sealed this 28th day of April 1964.

(SEAL)
Attest:

ERNEST W. SWIDER                                EDWARD J. BRENNER

Attesting Officer                                     Commissioner of Patents